United States Patent
Mizutani

(10) Patent No.: US 10,002,690 B2
(45) Date of Patent: Jun. 19, 2018

(54) SHIELDED CONDUCTIVE PATH

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yoshio Mizutani, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days. days.

(21) Appl. No.: 15/528,285

(22) PCT Filed: Nov. 13, 2015

(86) PCT No.: PCT/JP2015/081960
§ 371 (c)(1),
(2) Date: May 19, 2017

(87) PCT Pub. No.: WO2016/088532
PCT Pub. Date: Jun. 9, 2016

(65) Prior Publication Data
US 2017/0330650 A1    Nov. 16, 2017

(30) Foreign Application Priority Data
Dec. 3, 2014 (JP) .................. 2014-245073

(51) Int. Cl.
*H02G 15/08* (2006.01)
*H01B 9/02* (2006.01)
*H01B 9/00* (2006.01)

(52) U.S. Cl.
CPC ............... *H01B 9/02* (2013.01); *H01B 9/006* (2013.01)

(58) Field of Classification Search
CPC ....... H01B 7/0045; H01R 4/186; H02G 15/08
(Continued)

(56) References Cited

U.S. PATENT DOCUMENTS 6,914,190 B2 * 7/2005 Dunand ............... H02G 3/0468
                                                      174/71 R
7,094,970 B2   8/2006 Kihira
(Continued)

FOREIGN PATENT DOCUMENTS

JP    2004171952 A    6/2004
JP    2006310474 A    11/2006
(Continued)

OTHER PUBLICATIONS

International Search Report and Written Opinion for application PCT/JP2015/081960 dated Jan. 26, 2016; 4 Pages.

*Primary Examiner* — Chau N Nguyen
(74) *Attorney, Agent, or Firm* — Reising Ethington, P.C.

(57) ABSTRACT

A shielding portion of a shielded conductive path (Wa) includes: a shielded pipe in which the inside thereof is partitioned into a plurality of electrical wire insertion paths; and a flexible shielding member that is tubular and is connected to an end portion of the shielding pipe. Out of a plurality of electrical wires that are inserted into the electrical wire insertion paths, a second electrical wire is led out of the shielding portion from an outlet port. Inside the shielding portion, a shielding tube encloses the second electrical wire, and prevents the second electrical wire and the first electrical wire from being affected by electromag- (Continued)

netic noise therefrom. A gap between the shielding tube and an opening edge of the outlet port is closed by a conductive sealing member.

2 Claims, 4 Drawing Sheets

(58) Field of Classification Search
USPC .................................. 174/71 R, 72 R, 72 A
See application file for complete search history.

(56) References Cited

U.S. PATENT DOCUMENTS

| | | | |
|---|---|---|---|
| 8,692,114 B1 * | 4/2014 | Popescu | H05K 9/0018 |
| | | | 174/71 R |
| 9,396,840 B2 | 7/2016 | Mizutani | |
| 9,414,533 B2 | 8/2016 | Yanagihara | |
| 9,676,348 B2 * | 6/2017 | Sugino | B60R 16/0215 |
| 2004/0099427 A1 | 5/2004 | Kihira | |
| 2012/0279776 A1 * | 11/2012 | Mizutani | H02G 3/0481 |
| | | | 174/350 |
| 2015/0287500 A1 | 10/2015 | Mizutani | |
| 2015/0366106 A1 | 12/2015 | Yanagihara | |

FOREIGN PATENT DOCUMENTS

| | | |
|---|---|---|
| JP | 2011146228 A | 7/2011 |
| WO | WO2014119404 A1 | 8/2014 |

* cited by examiner

SHIELDED CONDUCTIVE PATH

CROSS REFERENCE TO RELATED APPLICATIONS

This application claims the priority of Japanese patent application JP2014-245073 filed on Dec. 3, 2014, the entire contents of which are incorporated herein.

TECHNICAL FIELD

The present invention relates to a shielded conductive path that has a configuration in which a plurality of electrical wires are enclosed by a shielding portion that is tubular.

BACKGROUND ART

Patent Document 1 (JP2004-171952A) discloses technology for routing electrical wires under the floor of a vehicle such as a hybrid car, to connect, for example, devices that are provided in a rear part of the vehicle, such as a high-voltage battery, and devices that are provided in a front part of the vehicle, such as an inverter and a fuse box, to each other. The plurality of electrical wires are inserted into a metal pipe that is provided with a shielding function as well as the function of protection from interference by foreign objects. Also, a flexible shielding member that is tubular and is constituted by braided wires or the like is connected to an end portion of the pipe, and portions of the electrical wires, the portions being led out of the pipe, are enclosed by the flexible shielding member. Since it is easy to bend the flexible shielding member, the flexible shielding member is useful when electrical wires are to be bent to be routed and connected to devices.

Also, Patent Document 2 (JP2011-146228A) discloses technology for shielding electromagnetic noise, and when the plurality of electrical wires are electrical wires of different types such as a powering electrical wire through which large amount of high-voltage currents flow and an electrical wire for a low-current system, and there is the risk of the plurality of electrical wires being mutually or unilaterally affected by electromagnetic noise therefrom, the inside of the pipe is divided into a plurality of insertion spaces by partition walls, and the plurality of electrical wires are individually inserted into the plurality of insertion spaces in order to prevent the electrical wires from being affected by electromagnetic noise.

SUMMARY

When electrical wires of a plurality of types are routed between a rear part and a front part of a vehicle, it is possible to combine the technologies disclosed in the above-described Patent Documents 1 and 2 to conceive of a configuration in which the electrical wires of the plurality of types are separately inserted into a metal pipe in which the inside thereof is divided into a plurality of insertion spaces by partition walls, and a flexible shielding member is connected to an end portion of the pipe. When an electrical wire of a certain type out of the electrical wires of the plurality of types is branched off and extends toward its connection point, it is possible to conceive of, for example, drawing the electrical wire to the outside of the flexible shielding member from a midpoint thereof.

However, if such a configuration is employed, the electrical wires of the plurality of types, which are isolated from each other inside the pipe so as not to be mutually affected by electromagnetic noise therefrom, are not isolated inside the flexible shielding member. Therefore, inside the flexible shielding member, there is the risk of the electrical wires of the plurality of types being affected by electromagnetic noise therefrom.

The present design has been completed in light of the above-described situation, and aims to secure a shielding function.

A shielded conductive path according to the present design may include:

a shielding portion that is tubular and encloses a plurality of electrical wires together;

a shielding pipe that is included in the shielding portion;

a plurality of electrical wire insertion paths that are divided by partition walls inside the shielding pipe and into which the electrical wires are inserted;

a flexible shielding member that is tubular and is connected to an end portion of the shielding pipe so as to be included in the shielding portion and so as to enclose areas of the electrical wires, the areas being led out from an end surface of the shielding pipe;

an outlet port that allows the inside and the outside of the shielding portion to be interconnected, and allows a particular electrical wire out of the plurality of electrical wires to be led out of the shielding portion;

a shielding tube that encloses the particular electrical wire inside the shielding portion and prevents the particular electrical wire and another electrical wire out of the plurality of electrical wires from being affected by electromagnetic noise therefrom; and a sealing member that is conductive and closes a gap between the shielding tube and an opening edge of the outlet port.

Inside the shielding portion, the shielding tube encloses the particular electrical wire that is led out of the shielding portion, and therefore the particular electrical wire and the other electrical wire are prevented from being affected by electromagnetic noise therefrom. Also, the gap between the shielding tube and the opening edge of the outlet port is closed by the sealing member that is conductive, and therefore the electrical wire inside the shielding portion and the electrical wire that is led out of the shielding portion are also prevented from being affected by electromagnetic noise therefrom. Therefore, a shielding function can be secured with the present design.

EMBODIMENT

In the shielded conductive path according to the present design, the shielding tube may be configured to protrude from an end surface of the shielding pipe and to penetrate through the flexible shielding member, an opening of the flexible shielding member that allows the shielding tube to penetrate through the flexible shielding member may be configured as the outlet port, and the sealing member may be a solder material that couples the opening edge of the outlet port and an outer circumferential surface of the shielding tube to each other.

With this configuration, it is possible to reliably seal the gap that is present along the opening edge of the outlet port, and it is also possible to prevent a gap from being formed between the opening edge of the outlet port and the outer circumferential surface of the shielding tube.

In the shielded conductive path according to the present design, the shielding tube may be connected to the electrical wire insertion paths without a gap.

With this configuration, no gap is formed between the electrical wire insertion paths and the shielding tube, and therefore it is possible to reliably shield the particular electrical wire.

First Embodiment

Figure 1:
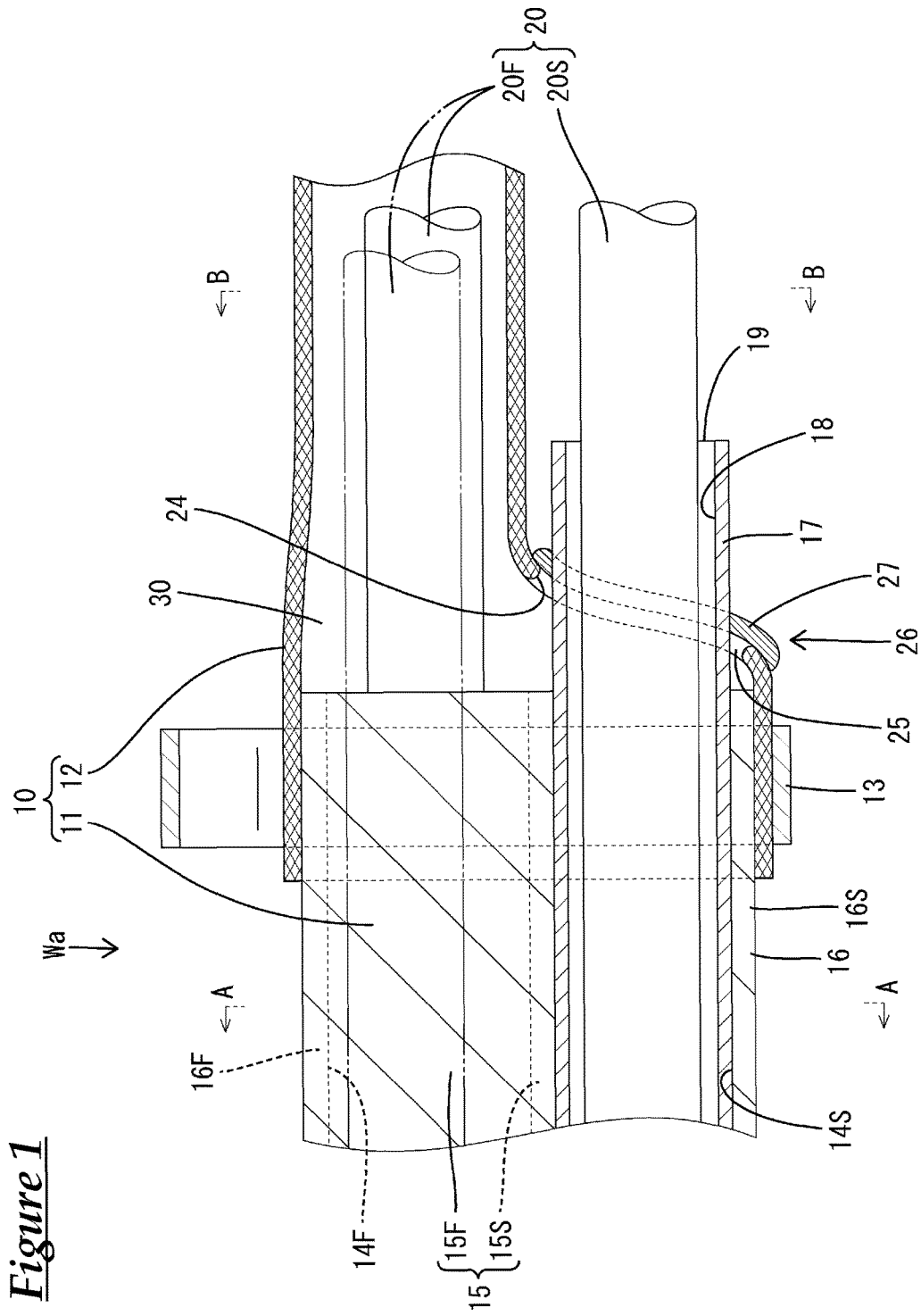
FIG. 1 is a cross-sectional view of a shielded conductive path according to a first embodiment.
Figure 2:
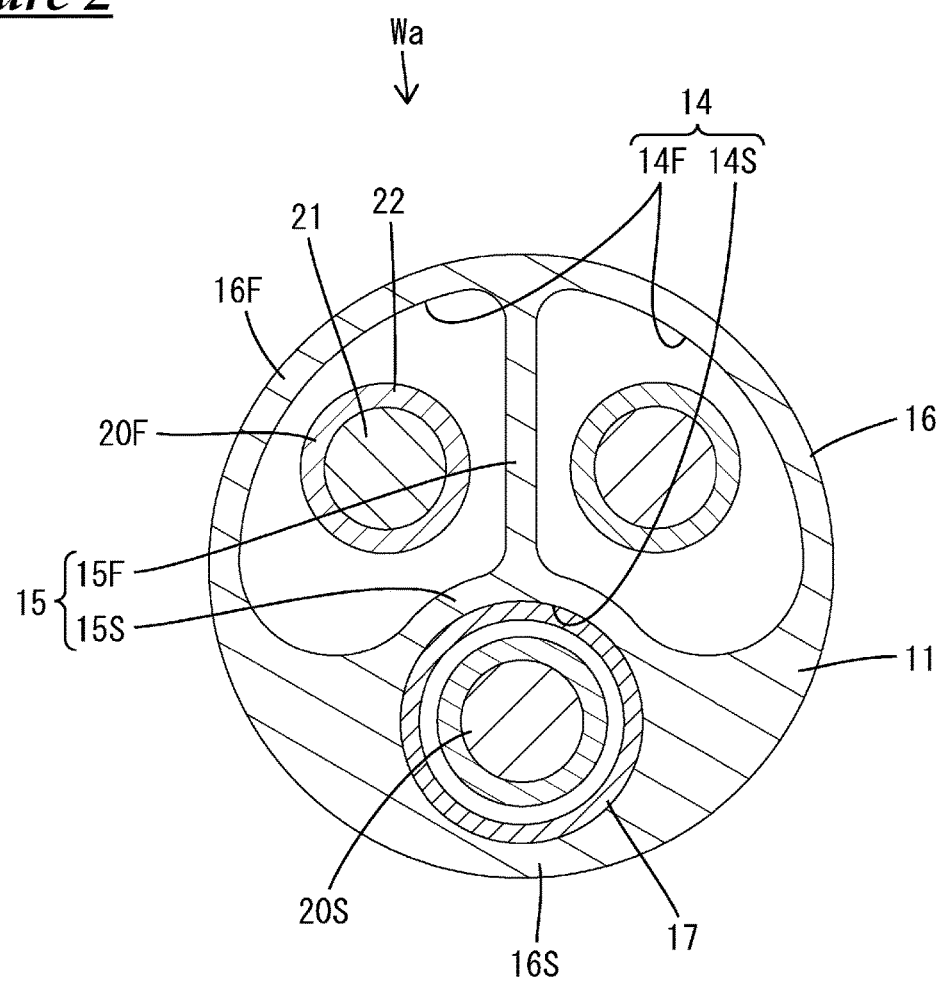
FIG. 2 is a cross-sectional view along a line A-A in FIG. 1.
Figure 3:
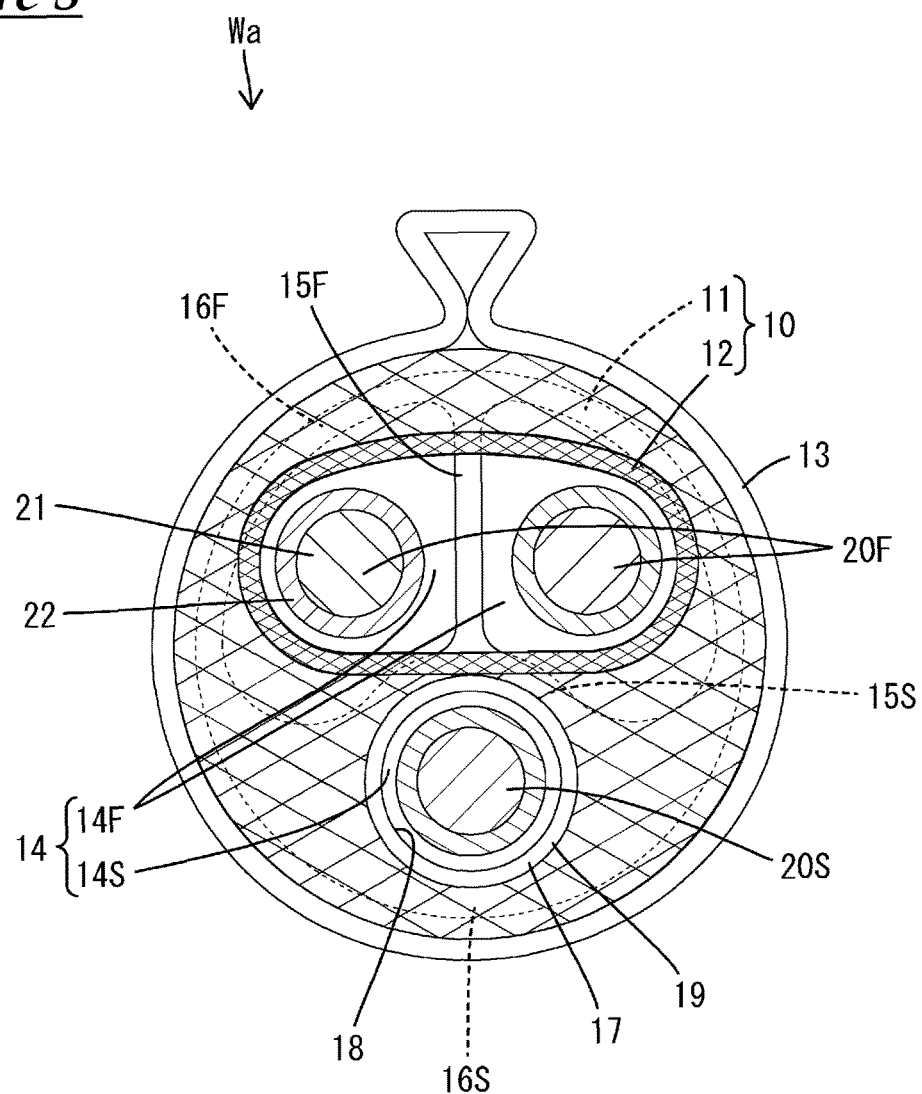
FIG. 3 is a cross-sectional view along a line B-B in FIG. 1.

The following describes an embodiment of the present design in detail with reference to FIGS. 1 to 3. A shielded conductive path Wa according to the first embodiment has a configuration in which a plurality of electrical wires 20 (three wires in the present embodiment) are enclosed and shielded by a shielding portion 10 that is tubular. The shielded conductive path Wa is routed under the floor of the vehicle body (not shown) of a vehicle such as a hybrid car, to connect devices that are installed in a rear part of the vehicle body, such as a high-voltage battery and a low-voltage battery (not shown), and devices that are installed in a front part of the vehicle body, such as an inverter and a fuse box (not shown), to each other.

Two electrical wires 20 out of the three electrical wires 20 are first electrical wires 20F ("another electrical wire" recited in Claims) that connect devices that are provided in the rear part of the vehicle, such as the high-voltage battery, and devices that are provided in the front part of the vehicle, such as the inverter, to each other. The remaining one electrical wire 20 is a second electrical wire 20S ("particular electrical wire" recited in Claims) that connects devices that are provided in the rear part of the vehicle, such as the low-voltage battery, and devices that are provided in the front part of the vehicle, such as the fuse box, to each other. Note that, out of the devices, at least the devices connected to the first electrical wires 20F are housed in a conductive shielded case.

The first electrical wires 20F and the second electrical wire 20S are both non-shielded electrical wires that have a circular cross section (see FIG. 2), in each of which an outer circumferential surface of a conductor 21 is enclosed by an insulating coating 22. The first electrical wires 20F are high-voltage electrical wires that constitute a high-voltage circuit, and are adapted to high voltages and large currents. Metal terminal parts (not shown) are connected to two end portions of each first electrical wire 20F, and are each electrically connected to a device. The second electrical wire 20S is a low-voltage electrical wire that constitutes a low-voltage circuit, and metal terminal parts (not shown) are connected to two end portions of the second electrical wire 20S, and are each electrically connected to a device.

The shielding portion 10 includes a shielding pipe 11 that encloses the three electrical wires 20F and 20S together, and a flexible shielding member 12 that is tubular and is connected to either end portion of the shielding pipe 11 so as to enclose portions of the three electrical wires 20F and 20S together, the portions being led out of the shielding pipe 11.

The shielding pipe 11 is made of a metal (such as steel, aluminum, or stainless steel), and the external shape of the cross section thereof is a substantially perfect circle (see FIG. 2). The shielding pipe 11 is bent along a routing path of the electrical wires 20 in a three-dimensional direction. In the first embodiment, the shielding pipe 11 is generally routed in a front-rear direction of the vehicle under the floor of the vehicle, and both end portions of the shielding pipe 11 in the front-rear direction are bent upward and are guided to the inside of the vehicle. Note that the shielding pipe 11 is fixed to the body of the vehicle using a plurality of attachment parts that are made of resin (not shown).

The flexible shielding member 12 is a braided member that is formed by interweaving conductive thin metal lines (e.g. copper) into a meshed pattern. One end side of the flexible shielding member 12 is swaged and fixed to the outer circumferential surface of the shielding pipe 11 so as to be conductive, using a metal band 13, and the other end side of the flexible shielding member 12 is fixed to a connector that is to be connected to a device or the like, so as to be conductive, using a metal band or the like. Note that the flexible shielding member 12 may be formed by winding a metal foil, instead of being a braided member.

As shown in FIG. 2, partition walls 15 that divide the internal space of the shielding pipe 11 into a plurality of electrical wire insertion paths 14 (three paths in the present embodiment) are provided inside the shielding pipe 11. Two electrical wire insertion paths 14 out of the three electrical wire insertion paths 14 are first insertion paths 14F into which the first electrical wires 20F are inserted, and are partitioned by a first partition wall 15F. The remaining one electrical wire insertion path 14 is a second insertion path 14S into which the second electrical wire 20S is inserted.

The cross section of the second insertion path 14S has the shape of a perfect circle throughout the entire length of the second insertion path 14S. The second insertion path 14S is located at a substantially central point in the direction in which the two first insertion paths 14F are arranged, in other words, at a point on an extension of the first partition wall 15F. A second partition wall 15S out of the partition walls 15, which is a partition between the first insertion paths 14F and the second insertion path 14S, has an arc-like shape that matches the shape of the second insertion path 14S.

A shielding tube 17 is attached to and is integrated with either end portion of the shielding pipe 11. The shielding tube 17 is made of a metal (such as steel, aluminum, copper, or stainless steel), and is configured to have a shielding function. The outer circumferential surface of the shielding tube 17 has the shape of a perfect circle. A base end portion of the shielding tube 17 is pressed into an end portion of the second insertion path 14S, and the base end portion of the shielding tube 17 and the end portion of the second insertion path 14S are connected to each other so as to secure electrical conduction. No clearance (gap) that allows electromagnetic noise to pass therethrough is provided between the outer circumferential surface of the shielding tube 17 and the inner circumferential surface of the second insertion path 14S.

A portion of the shielding tube 17, the portion protruding from an end surface of the shielding pipe 11, is located in the space that is enclosed by the flexible shielding member 12 out of the shielding portion 10. An edge portion of the shielding tube 17 penetrates through the flexible shielding member 12 and is led out of the shielding portion 10 (the flexible shielding member 12). A portion of the flexible shielding member 12, the portion being penetrated by the shielding tube 17, is an outlet port 24 at which the mesh is coarse so as to allow the shielding tube 17 to pass therethrough.

The inside of the shielding tube 17 is an extension insertion path 18 that is coaxially continuous with the second insertion path 14S of the shielding pipe 11. As described above, no clearance that allows electromagnetic noise to pass therethrough is provided in the portion that connects the second insertion path 14S and the extension insertion path 18. The extension insertion path 18 encloses an area of the second electrical wire 20S, the area being led out of the shielding pipe 11 (the second insertion path 14S). The first electrical wires 20F for high voltages and the second electrical wire 20S for low voltages are both present in the space that is enclosed by the flexible shielding member 12. However, the second electrical wire 20S is enclosed by the shielding tube 17, and is therefore not affected by electromagnetic noise from the first electrical wires 20F for high voltages.

A gap 25 is present between the opening edge of the outlet port 24 of the flexible shielding member 12 and the outer circumferential surface of the shielding tube 17. The gap 25 extends along the opening edge of the outlet port 24, and allows the inside and the outside of the shielding portion 10 to be interconnected. Therefore, there is a concern that electromagnetic noise that is emitted from the first electrical wires 20F for high voltages will pass through the gap 25 and affect the area of the second electrical wire 20S, the area being exposed outside of the shielding tube 17. Considering this concern, the gap 25 in the first embodiment is closed by a sealing member 26 that is conductive. The sealing member 26 is constituted by a solder material 27, and electrically connects and mechanically couples the opening edge of the outlet port 24 and the outer circumferential surface of the shielding tube 17 to each other.

As described above, the shielded conductive path Wa according to the first embodiment includes: the shielding portion 10 that is tubular and encloses the plurality of electrical wires 20F and 20S together; the shielding pipe 11 that is included in the shielding portion 10; the plurality of electrical wire insertion paths 14F and 14S that are partitioned by the partition walls 15 inside the shielding pipe 11 and into which the electrical wires 20F and 20S are inserted; and the flexible shielding member 12 that is tubular and is connected to an end portion of the shielding pipe 11 so as to be included in the shielding portion 10 and so as to enclose areas of the electrical wires 20F and 20S, the areas being led out from an end surface of the shielding pipe 11.

The flexible shielding member 12 is provided with the outlet port 24 that allows the inside and the outside of the shielding portion 10 (the flexible shielding member 12) to be interconnected, and allows the second electrical wire 20S out of the plurality of electrical wires 20F and 20S to be led out of the shielding portion 10. The shielded conductive path Wa also includes: the shielding tube 17 that encloses the second electrical wire 20S inside the shielding portion 10 and prevents the second electrical wire 20S and the first electrical wires 20F from being affected by electromagnetic noise therefrom; and the sealing member 26 that is conductive and closes the gap 25 between the shielding tube 17 and the opening edge of the outlet port 24.

Inside the shielding portion 10, the shielding tube 17 encloses the second electrical wire 20S that is led out of the shielding portion 10, and therefore the second electrical wire 20S and the first electrical wires 20F are prevented from being affected by electromagnetic noise therefrom. Also, the gap 25 between the shielding tube 17 and the opening edge of the outlet port 24 is closed by the sealing member 26 that is conductive, and therefore the first electrical wires 20F inside the shielding portion 10 and the first electrical wire 20S outside the shielding portion 10 are also prevented from being affected by electromagnetic noise therefrom. Therefore, the shielded conductive path Wa according to the first embodiment is reliable in terms of its shielding function.

Also, in the shielded conductive path Wa according to the first embodiment, the shielding tube 17 is configured to protrude from an end surface of the shielding pipe 11 and to penetrate through the flexible shielding member 12, and an opening of the flexible shielding member 12 that allows the shielding tube 17 to penetrate through the flexible shielding member 12 is configured as the outlet port 24 that is a path through which the second electrical wire 20S is led out of the shielding portion 10. The sealing member 26 is the solder material 27 that couples the opening edge of the outlet port 24 and the outer circumferential surface of the shielding tube 17 to each other. With this configuration, it is possible to reliably seal the gap 25 that is present along the opening edge of the outlet port 24. Furthermore, it is possible to prevent the gap 25 from being formed between the opening edge of the outlet port 24 and the outer circumferential surface of the shielding tube 17.

Second Embodiment

Figure 4:
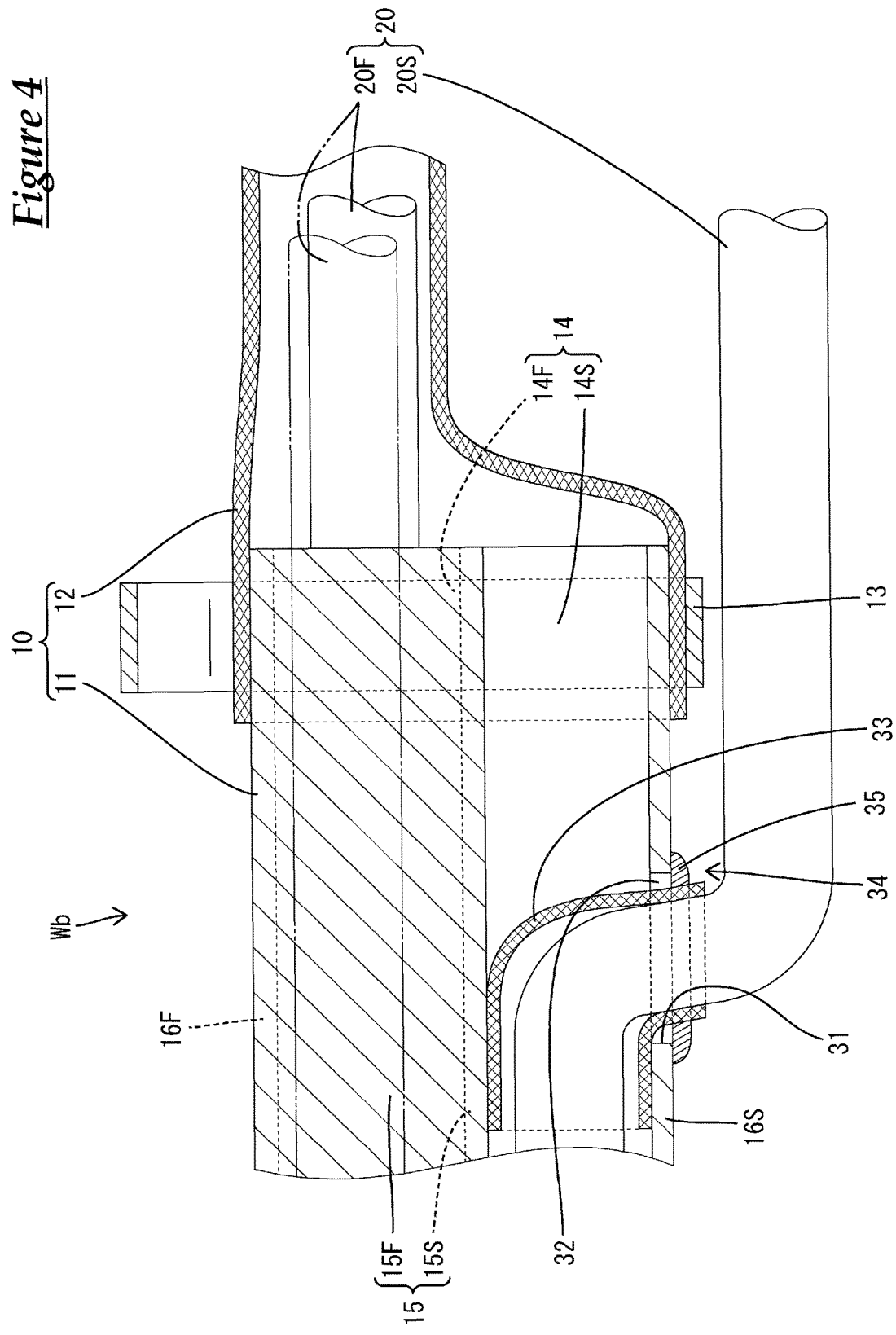
FIG. 4 is a cross-sectional view of a shielded conductive path according to a second embodiment.

Next, a shielded conductive path Wb according to a second embodiment of the present design will be described with reference to FIG. 4. The shielded conductive path Wb according to the second embodiment is different from the first embodiment in regards to a shielding tube 33 and an outlet port 31. In the second embodiment, components that are the same as those in the first embodiment are given the same reference signs, and duplicate descriptions are omitted.

The shielded conductive path Wb according to the second embodiment, as with the first embodiment, includes: the shielding pipe 11 that encloses the two first electrical wires 20F ("another electrical wire" recited in Claims) and the one second electrical wire 20S ("particular electrical wire") together; and the flexible shielding member 12 that is tubular and is connected to an end portion of the shielding pipe 11. The partition walls 15 (the first partition wall 15F and the second partition wall 15S) that divide the internal space of the shielding pipe 11 into three electrical wire insertion paths 14 (the first insertion paths 14F and the second insertion path 14S) are provided inside the shielding pipe 11. The first electrical wires 20F are inserted into the first insertion paths 14F, and the second electrical wire 20S is inserted into the second insertion path 14S. The space that is outside the shielding pipe 11 and that is enclosed by the flexible shielding member 12 is an outside-the-pipe shielding space 30 that is adjacent to an edge surface of the shielding pipe 11.

The first insertion paths 14F are open at the two end surfaces (edge surfaces) of the shielding pipe 11, and are interconnected with the outside-the-pipe shielding spaces 30. The first electrical wires 20F are inserted into the first insertion paths 14F so as to penetrate therethrough. As with the first insertion paths 14F, the second insertion path 14S is open at the two end surfaces of the shielding pipe 11, and is interconnected with the outside-the-pipe shielding space 30. Therefore, the first insertion paths 14F and the second insertion path 14S are interconnected via the outside-the-pipe shielding space 30.

Out of circumferential walls 16 that are included in the shielding pipe 11, a second circumferential wall 16S that defines the second insertion path 14S is provided with the outlet port 31 that allows the inside of the second insertion path 14S and the outside of the shielding pipe 11 (the shielding portion 10) to be interconnected. The outlet port 31 is open at a position that is close to either end of the outer circumferential surface of the shielding pipe 11 in the axial direction, but is not covered by a flexible shielding member 12. The second electrical wire 20S that is inserted into the second insertion path 14S is led out of the shielding portion 10 (the shielding pipe 11) via the outlet port 31.

The shielding tube 33 according to the second embodiment, as with the flexible shielding member 12, is constituted by braided wires, a metal foil, or the like. The entire circumferential surface of a base end portion of the shielding tube 33 is fixed to the inner circumferential surface of the second insertion path 14S through welding or the like. Therefore, no clearance that affects the transfer of electromagnetic noise is present between the outer circumferential surface of the based end portion of the shielding tube 33 and the inner circumferential surface of the second insertion path 14S. Also, an edge portion of the shielding tube 33 is led out of the shielding pipe 11 from the outlet port 31.

An end portion of the second insertion path 14S is interconnected with the first insertion paths 14F via the outside-the-pipe shielding space 30, and therefore there is a concern that the second electrical wire 20S is affected by electromagnetic noise from the first electrical wires 20F. To address this concern, an area of the second electrical wire 20S, the area being close to the outlet port 31, is enclosed by the shielding tube 33 inside the second insertion path 14S, and the area penetrates through the outlet port 31 and is led out of the shielding pipe 11 (the shielding portion 10), in the state of being enclosed by the shielding tube 33. Then, the base end portion of the shielding tube 33 is fixed to the inner circumferential surface of the second insertion path 14S at a position that is opposite the outside-the-pipe shielding space 30 with respect to the outlet port 31. Therefore, inside the second insertion path 14S, there is no risk of the second electrical wire 20S being affected by electromagnetic noise from the first electrical wires 20F.

A gap 32 is present between the opening edge of the outlet port 31 of the shielding pipe 11 and the outer circumferential surface of the edge portion of the shielding tube 33. The gap 32 extends along the opening edge of the outlet port 31, and allows the inside and the outside of the shielding portion 10 to be interconnected. Therefore, there is a concern that electromagnetic noise that is emitted from the first electrical wires 20F for high voltages will pass through the outside-the-pipe shielding space 30, an area of the second insertion path 14S, the area being closer to the edge side than the outlet port 31, and the gap 32, and affect an area of the second electrical wire 20S, the area being led out of the shielding portion 10. Considering this concern, the gap 32 in the second embodiment is closed by a sealing member 34 that is conductive. The sealing member 34 is constituted by a solder material 35, and electrically connects and mechanically couples the opening edge of the outlet port 31 and the outer circumferential surface of an edge portion of the shielding tube 33 to each other.

Inside the shielding portion 10 of the shielded conductive path Wb according to the second embodiment, the shielding tube 33 encloses the second electrical wire 20S that is led out of the shielding portion 10, and therefore the second electrical wire 20S and the first electrical wires 20F are prevented from being affected by electromagnetic noise therefrom. Also, the gap 32 between the shielding tube 33 and the opening edge of the outlet port 31 is closed by the sealing member 34 that is conductive, and therefore the first electrical wires 20F inside the shielding portion 10 and the first electrical wire 20S outside the shielding portion 10 are also prevented from being affected by electromagnetic noise therefrom. Therefore, the shielded conductive path Wb according to the second embodiment is reliable in terms of its shielding function. The sealing member 34 is the solder material 35 that couples the opening edge of the outlet port 31 and the outer circumferential surface of the shielding tube 33 to each other. With this configuration, it is possible to reliably seal the gap 32 that is present along the opening edge of the outlet port 31. Furthermore, it is possible to prevent the gap 32 from being formed between the opening edge of the outlet port 31 and the outer circumferential surface of the shielding tube 33.

Other Embodiments

The present invention is not limited to the embodiments that have been described above with reference to the drawings, and, for example, the following embodiments are also included in the technical scope of the present invention.

In the above-described first and second embodiments, the sealing member is constituted by a solder material. However, the sealing member may be a tape-like or foil-like member that is conductive and adhesive, braided wires that are formed by interweaving thin metal lines into a meshed pattern, or the like.

In the above-described first and second embodiments, a description has been given of an example in which the plurality of electrical wires include an electrical wire for high voltages and an electrical wire for low voltages. However, the plurality of electrical wires may be a combination of a power supply line and a signal line.

In the above-described first and second embodiments, the plurality of electrical wires are a combination of electrical wires for which there is a concern that electrical wires are mutually affected by electromagnetic noise therefrom if they are routed so as to be close to each other. However, the plurality of electrical wires may be a combination of electrical wires that cannot be mutually affected by electromagnetic noise therefrom in the shielding portion, such as signal lines. If this is the case, it is unnecessary to provide a partition in the shielding portion.

In the above-described first and second embodiments, the shielding pipe is only made of a metal material. However, this is not essential, and the shielding pipe may be made of any material and may be configured in any manner as long as it has a shielding function. For example, the shielding pipe may have a structure in which a metal foil is coaxially embedded in a pipe that is made of resin.

In the above-described first and second embodiments, the flexible shielding member is a braided member that is formed so as to be tubular by interweaving conductive thin metal lines (e.g. copper) into a meshed pattern. However, this is not essential, and the flexible shielding member may be, for example, a corrugated tube into which a metal foil is inserted so as to extend along the entire circumference and the entire length of the corrugated tube.

In the above-described first and second embodiments, the inside of the shielding pipe is divided into three electrical wire insertion paths. However, this is not essential, and the number of electrical wire insertion paths that are to be provided in the shielding pipe can be changed as appropriate according to the type of electrical wires that are desired to be routed so as to be separate from each other.

In the above-described first and second embodiments, an electrical wire of one type, out of electrical wires of two types, is led out of the shielding portion. However, this is not essential, and for example, electrical wires of three or more types may be enclosed by the shielding portion, and of these, electrical wires of two or more types may be led out of the shielding portion from outlet ports that are provided so as to respectively correspond to the electrical wires of two or more types.

In the above-described first and second embodiments, the external shape of the cross section of the shielding pipe is a substantially perfect circle. However, this is not essential, and the external shape may be ellipsoidal, for example.

In the above-described first and second embodiments, the number of electrical wires is three. However, the number of electrical wires may be two, or four or more.

In the above-described first and second embodiments, the electrical wires are connected to a device that is provided in a rear part of a vehicle, such as a high-voltage battery, a device that is provided in a front part of the vehicle, such as an inverter, a device that is provided in the rear part of the vehicle, such as a low-voltage battery, and a device that is provided in the front part of the vehicle, such as a fuse box. However, the electrical wires may be connected to a low-voltage battery that is installed in the front part of the vehicle, a DC/DC converter that is installed in the rear part of the vehicle, and so on.

In the above-described second embodiment, the outlet port has the shape of a hole that penetrates through the circumferential wall of the shielding pipe and that is closed along the entire circumference. However, the outlet port may be configured as a slit portion that has been cut out in an end portion of the shielding pipe.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

Wa: Shielded Conductive Path
10: Shielding Portion
11: Shielding Pipe
12: Flexible Shielding Member
14: Electrical Wire Insertion Paths
15: Partition Walls
17: Shielding Tube
20: Electrical Wires
20F: First Electrical Wire (Another Electrical Wire)
20S: Second Electrical Wire (Particular Electrical Wire)
24: Outlet Port
25: Gap
26: Sealing Member
27: Solder Material
Wb: Shielded Conductive Path
31: Outlet Port
32: Gap
33: Shielding Tube
34: Sealing Member
35: Solder Material

The invention claimed is:

1. A shielded conductive path comprising:
a shielding portion that is tubular and encloses a plurality of electrical wires together;
a shielding pipe that is included in the shielding portion;
a plurality of electrical wire insertion paths that are divided by partition walls inside the shielding pipe and into which the electrical wires are inserted;
a flexible shielding member that is tubular and is connected to an end portion of the shielding pipe so as to be included in the shielding portion and so as to enclose areas of the electrical wires, the areas being led out from an end surface of the shielding pipe;
an outlet port that allows the inside and the outside of the shielding portion to be interconnected, and allows a particular electrical wire out of the plurality of electrical wires to be led out of the shielding portion;
a shielding tube that encloses the particular electrical wire inside the shielding portion and prevents the particular electrical wire and another electrical wire out of the plurality of electrical wires from being affected by electromagnetic noise therefrom; and
a sealing member that is conductive and closes a gap between the shielding tube and an opening edge of the outlet port;
wherein the shielding tube is connected to one of the plurality of electrical wire insertion paths without a gap.

2. A shielded conductive path comprising:
a shielding portion that is tubular and encloses a plurality of electrical wires together;
a shielding pipe that is included in the shielding portion;
a plurality of electrical wire insertion paths that are divided by partition walls inside the shielding pipe and into which the electrical wires are inserted;
a flexible shielding member that is tubular and is connected to an end portion of the shielding pipe so as to be included in the shielding portion and so as to enclose areas of the electrical wires, the areas being led out from an end surface of the shielding pipe;
an outlet port that allows the inside and the outside of the shielding portion to be interconnected, and allows a particular electrical wire out of the plurality of electrical wires to be led out of the shielding portion;
a shielding tube that encloses the particular electrical wire inside the shielding portion and prevents the particular electrical wire and another electrical wire out of the plurality of electrical wires from being affected by electromagnetic noise therefrom; and
a sealing member that is conductive and closes a gap between the shielding tube and an opening edge of the outlet port;
wherein the shielding tube is configured to protrude from an end surface of the shielding pipe and to penetrate through the flexible shielding member,
an opening of the flexible shielding member that allows the shielding tube to penetrate through the flexible shielding member is configured as the outlet port, and the sealing member is a solder material that couples the opening edge of the outlet port and an outer circumferential surface of the shielding tube to each other.

* * * * *